United States Patent [19]

Bunker

[11] Patent Number: 5,240,311
[45] Date of Patent: Aug. 31, 1993

[54] GLAD HAND SEAL

[76] Inventor: Donald D. Bunker, 960 Calle Amanecer, San Clemente, Calif. 92672

[21] Appl. No.: 879,969

[22] Filed: May 6, 1992

[51] Int. Cl.$^5$ ............................................. B60D 1/08
[52] U.S. Cl. ...................................... 303/7; 285/68
[58] Field of Search ............... 303/7, 9; 285/63, 65, 285/68, 74, 69

[56] References Cited

U.S. PATENT DOCUMENTS

| | | | |
|---|---|---|---|
| 157,951 | 12/1874 | Westinghouse, Jr. | 285/68 |
| 383,160 | 5/1888 | Wahlert | 285/68 |
| 1,065,515 | 6/1913 | Ewert | 285/68 |
| 1,593,605 | 7/1926 | Sheafe | 285/68 |
| 2,689,140 | 9/1954 | Bonacci | 285/69 |

Primary Examiner—Matthew C. Graham
Attorney, Agent, or Firm—Stetina and Brunda

[57] ABSTRACT

A seal for use in fluid couplings, such as those utilized in compressed air braking systems for tractor trailers and the like, has a lower portion, an intermediate portion, and an upper portion. The outer diameter of the intermediate portion is less then the outer diameters of the lower and upper portions and the outer diameter of the upper portion is less then the outer diameter of the lower portion. A bore extends through the lower, intermediate, and upper portions for providing fluid communication through the seal. The outer diameter of the upper portion and the upper surface of the upper portion at the bore are formed to have bevels such that the propensity for swaging or folding over of the upper surface during the coupling process is reduced. The seal is molded of polyurethane and color coded to mitigate the potential for cross connecting of the normal and emergency compressed air lines of a truck's braking system.

8 Claims, 2 Drawing Sheets

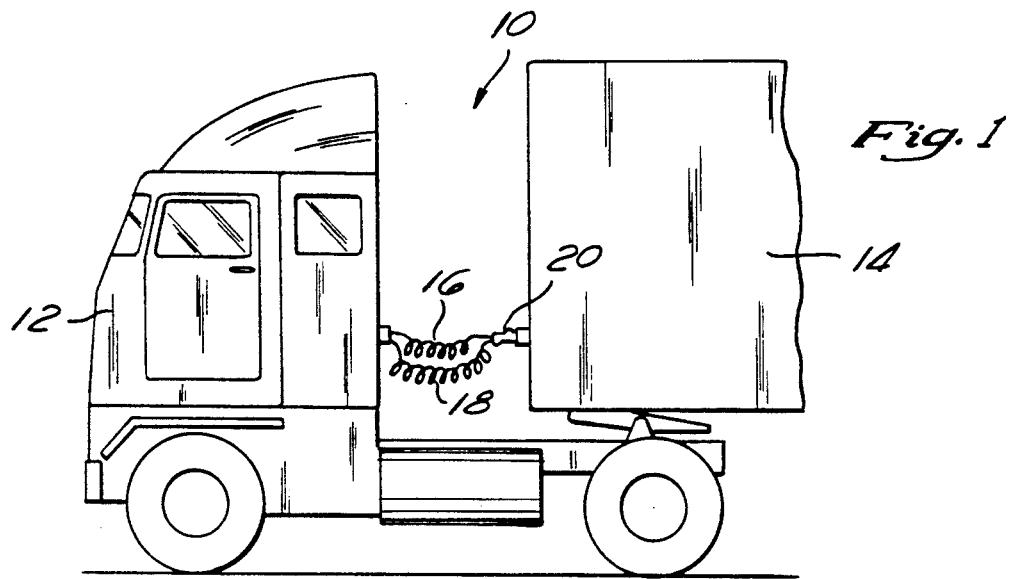
Fig. 1
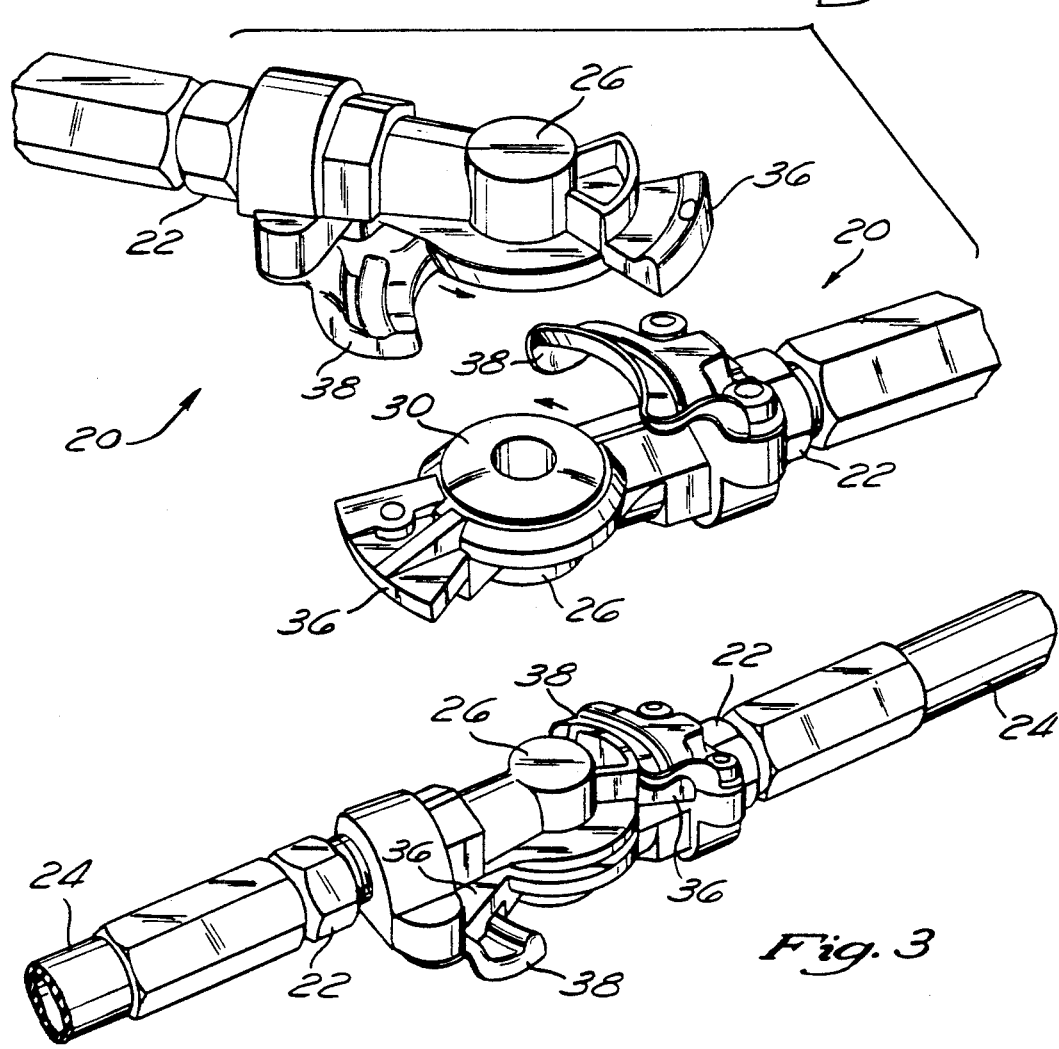
Fig. 2
Fig. 3

GLAD HAND SEAL

FIELD OF THE INVENTION

The present invention relates generally to fluid couplings and more particularly to an improved glad hand seal such as those utilized in the compressed air braking systems of tractor trailers and the like.

BACKGROUND OF THE INVENTION

Compressed air braking systems such as those used in tractor trailers and the like are well known. In such systems, an air compressor, typically located proximate the engine in the truck, provides compressed air to the brakes of both the truck and the trailer portions of the tractor trailer. Flexible hoses having glad hand couplings are utilized to provide fluid communication from the truck to the trailer.

Such glad hand couplings comprise generally identical mating connectors. Rubber seals are utilized to provide a substantially leak free connection. To effect mating of the glad hand couplings, the two corresponding connectors are positioned perpendicular to one another with their rubber seals laminarly juxtaposed. With the glad hand couplings so positioned, they are rotated approximately ninety degrees, i.e., into alignment with one another, to compress the rubber seals and lock the two glad hand couplings together. In the locked position, the glad hand seals are pressed tightly together such that compressed air tends to flow through the coupling without leaking from between the seals.

However, contemporary rubber seals exhibit a propensity to deform or swage during the coupling process. Swaging typically occurs as the rubber seals of the two glad hand couplings are slid into laminar juxtaposition. Often, a portion of one seal, typically the aperture thereof, will engage the periphery of the opposite seal and cause the engaged portion thereof to roll or curl back toward the center of the seal. Such curling or deformation of the seal, known as swaging, both increases the likelihood of a leak occurring and structurally weakens or damages the seal. The likelihood of a leak occurring is increased since the curled portion of the seal prevents proper mating of the two glad hand seals and tends to provide a path for air leakage therealong.

The deformed seal may be structurally weakened or damaged, particularly as a consequence of prolonged or repeated deformation, due to excessive stretching of the rubber. This stretching commonly results in cracking or tearing of the seal, thus contributing to its tendency to leak.

The propensity for swaging of contemporary glad hand rubber seals is enhanced by the sharply angled, thin peripheral edge portion of the rubber seal. The sharply angled thin periphery of the upper portion of contemporary glad hand seals is very flexible and thus susceptible to being pulled up, away from the glad hand coupling, such that it may fold or curl back toward the bore or opening thereof.

The propensity for contemporary glad hand seals to swage is further enhanced by the sharp, right angle, non-beveled, diameter of the bore at the upper surface of the seal. This sharp, non-beveled diameter tends to engage the outer periphery of the upper surface of an opposing seal during the mating process, thereby pulling it toward the bore thereof as the rubber seals of the two glad hand couplings are brought into laminar juxta position.

Additionally, compressed air braking systems such as those utilized on tractor trailers commonly utilize dual braking systems having both normal and emergency compressed air sources, conduits, and cylinders. Because the compressed air couplings of both normal and emergency compressed air braking systems are identical, there is an ever present potential for incorrectly or cross connecting the two systems such that the emergency air source is in fluid communication with the normal braking system of the trailer and the normal air source is in fluid communication with the emergency braking system of the trailer.

While such cross connecting may not necessarily present an immediate hazard, it does have potential drawbacks. For example, such improper connection could potentially lead to cross-contamination of the two, i.e., normal and emergency, braking systems in the event that one of the systems should become contaminated with dirt, oil, or some other undesirable material.

Furthermore, in some instances the normal and emergency compressed air braking systems may not comprise identical components, i.e. compressed air sources, conduits, and/or cylinders. The compressor of the emergency system may not be designed for use with the cylinders of the normal systems, for example. Thus, inadvertent cross connection may result in suboptimal performance of the tractor trailer's braking system.

As such, it is generally considered undesirable to improperly hook up or cross connect the normal and emergency compressed air braking systems. However, it is generally not desirable to form the normal and emergency glad hand couplings such that they cannot be cross connected because such cross connecting is occasionally necessary. This might occur, for instance, if a malfunction occurred in the air source for the normal system and a separate malfunction occurred in the emergency braking system of the trailer. The occurrence of two such malfunctions would render both the normal and the emergency braking systems of the truck inoperative, unless the two braking systems are cross connected to utilize the air source of the emergency braking system with the trailer's normal braking system such that one complete, functioning braking system is provided. Although not a desirable situation, the cross connecting repair does provide an emergency means for continuing operation of the vehicle until a proper repair can be effected.

Thus, although such compressed air systems have proven generally suitable for their intended purposes, they possess inherent deficiencies which detract from their overall safety and effectiveness. In view of the shortcomings of the prior art, it is desirable to provide an improved seal for glad hand couplings and the like which exhibits a reduced propensity for swaging during the coupling process and which reduces the likelihood of cross connecting.

SUMMARY OF THE INVENTION

The present invention specifically addresses and alleviates the above mentioned deficiencies associated in the prior art. More particularly, the present invention comprises a seal for use in fluid couplings, such as those utilized in glad hand compressed air braking systems for tractor trailers and the like.

The seal has a lower portion, an intermediate portion, and an upper portion wherein the outer diameter of the intermediate portion is less then the outer diameters of the lower and upper portions and the outer diameter of the upper portion is less then the outer diameter of the lower portion. A bore extends through the upper, intermediate, and lower portions for providing fluid communication through the seal.

The outer diameter of the upper portion as well as the upper surface of the upper portion at the bore are formed to have bevels such that the propensity for swaging or folding over of the upper surface during the coupling process is reduced. The seal is molded of polyurethane and color coded to mitigate the potential for cross connecting of the normal and emergency compressed air lines of a truck's braking system.

The lower portion of the seal has an outer diameter of between approximately 1⅜ inch and approximately 1½ inch, preferably 1 7/16 inch. The intermediate portion has an outer diameter of between approximately 1 1/16 inch and approximately 1 3/16 inch, preferably approximately 1⅛ inch. The upper portion has an outer diameter of between approximately 1¼ inch and 1⅜ inch, preferably approximately 1 5/16 inch. The bore preferably has a diameter of approximately ⅝ inch. The seal is preferably approximately ⅜ inch thick.

A bevel formed upon the outer diameter of the upper portion has a radius of at least approximately 1/64 inch, preferably of approximately 1/32 inch.

The bore of the seal, at the upper surface thereof, has a bore bevel formed thereon having a radius of at least approximately 1/64 inch, preferably approximately 1/32 inch.

The bevel formed upon the outer diameter of the upper portion of the seal eliminates the thin, flexible periphery of the prior art and consequently mitigates the likelihood of swaging. The periphery of the upper portion of the glad hand seal of the present invention is substantially more rigid than that of the prior art. Thus, being more rigid and lacking the sharp, flexible periphery of the prior art, the upper surface of the glad hand seals of the present invention cannot be easily rolled or folded over toward the bore thereof. As such, the glad hand seals of the present invention are substantially less likely to leak and/or to incur wear or damage as a result of swaging.

The likelihood of swaging is further reduced in the glad hand seals of the present invention by the formation of the bore bevel at the upper surface of the bore. Swaging generally occurs in prior art devices when the right angle, i.e. non-beveled, bore engages the upper portion of a mating seal and forces it to roll back or fold over. By beveling the upper surface of the bore, its ability to engage and fold or roll over the upper surface of a mating seal is substantially reduced.

Thus, the combination of beveling the outer diameter of the upper portion of the glad hand seal and beveling the upper portion of the bore thereof, makes swaging extremely unlikely. This both increases the life of the seal and reduces the likelihood of leaks occurring in the normal and emergency compressed air braking systems of tractor trailers and the like.

The seals are color coded to distinguish their use between the normal and emergency compressed air line couplings to mitigate the potential for cross connecting thereof. The seals to be utilized in the glad hand couplings of the normal compressed air braking system are preferably colored blue and the seals to be utilized in the glad hand couplings of the emergency compressed air braking system are preferably colored red. Those skilled in the art will recognize that various other color configurations are likewise suitable.

These, as well as other advantages of the present invention will be more apparent from the following description and drawings. It is understood that changes in the specific structure shown and described may be made within the scope of the claims without departing from the spirit of the invention.

BRIEF DESCRIPTION OF THE DRAWINGS

FIG. 1 is a side view of a tractor trailer illustrating the use of glad hand couplings in the normal and emergency compressed air braking systems thereof;

FIG. 2 is a perspective view of two glad hand couplings positioned such that they are ready to be attached to one another;

FIG. 3 is a perspective view of the glad hand couplings of FIG. 2 after attachment thereof has been effected;

FIG. 4b is a cross-sectional side view taken along lines 4b of FIG. 4a;

FIG. 5b is a cross-sectional side view taken along lines 5b of FIG. 5a;

DETAILED DESCRIPTION OF THE PREFERRED EMBODIMENT

Figure 4A:
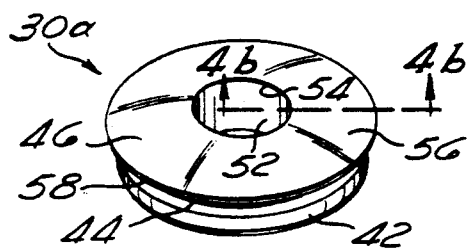
FIG. 4a is a perspective view of a prior art glad hand seal.

The detailed description set forth below in connection with the appended drawings is intended as a description of the presently preferred embodiment of the invention, and is not intended to represent the only form in which the present invention may be constructed or utilized. The description sets forth the functions and sequence of steps for constructing and operating the invention in connection with the illustrated embodiment. It is to be understood, however, that the same or equivalent functions and sequences may also be accomplished by different embodiments that are also intended to be encompassed within the spirit and scope of the invention.

The glad hand seal of the present invention is illustrated in FIGS. 1-3, 5a, 5b, 7, and 8 which depict a presently preferred embodiment of the invention. FIGS. 4a, 4b, 6a, 6b, and 6c depict prior art seals and the problems associated therewith.

Referring now to FIG. 1, a tractor trailer 10 comprising a truck 12 and trailer 14 typically utilizes a compressed air braking system having normal and emergency air sources or compressors (not shown), actuators or air cylinders (not shown) on each of the wheels of the truck 12 and trailer, and interconnecting normal 16 and emergency 18 air hoses for providing compressed air from the air source to the cylinders of the trailer 14. Glad hand couplings 20 are commonly utilized to effect connection of the normal 16 and emergency 18 compressed air lines from the cab 12 to the trailer 14.

Referring now to FIG. 2, each glad hand 20 comprises a fitting 22 by which the glad hand is connected to a compressed air conduit 24. The glad hand further comprises a body 26 within which the glad hand seal 30 is disposed. Each glad hand further has a paw 36 extending from the distal end thereof and a catch 38 on the proximal end thereof. The paws 36 and catches 38 of identical, mating couplings are configured such that the paw 36 of each coupling 20 is configured to be received by and detentably captured within the catch 38 of the coupling 20 to which it is mated.

Mating of two glad hand connectors 20 is accomplished by first disposing the connectors approximately perpendicular to one another (as illustrated in FIG. 2) with the glad hand seals 30 thereof in laminar juxtaposition. The paw 36 of each coupling 20 is positioned such that it is about to enter the catch 38 of the other coupling 20. Rotating one coupling 20 by approximately ninety degrees such that the conduits 24 thereof are in-line (as illustrated in FIG. 3), causes the paws 36 of each coupling 22 to be received within and detentably engaged to the corresponding catches 38 of the other coupling 20. This rotation additionally forces the bodies 26 of the two connectors together, thus compressing the glad hand seals 30 thereof into a substantially leak-free mating or engagement.

Figure 4B:
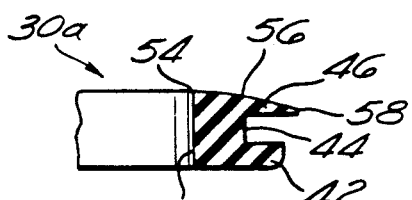

Referring now to FIGS. 4a and 4b, a prior art glad hand seal 30a is illustrated. The prior art glad hand seal comprises a lower portion 42, an intermediate portion 44 formed upon the lower portion 42, and an upper portion 46 formed upon the intermediate portion 44. The diameter of the intermediate portion 44 is less than the diameters of the lower portion 42 and upper portion 46. The diameter of the upper portion 46 is greater than the diameter of the lower portion 42. The bore 52 has a sharp, i.e. right angle, periphery 54 at the upper surface 56 of the upper portion 46.

The periphery of the upper portion 46 forms a sharp edge 58. The thickness of the upper member 46 is reduced considerably at the periphery or sharp edge 58 thereof. Glad hand seals of the prior art are comprised of natural rubber. The sharp edge 58 is consequently substantially flexible.

Figure 6A:
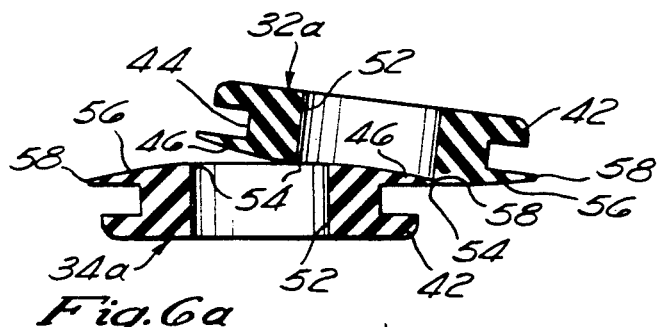
FIG. 6a is a cross-sectional side view of two prior art glad hand seals in the process of mating.
Figure 6B:
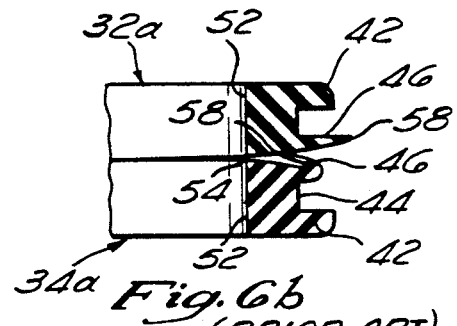
FIG. 6b is a cross-sectional side view of the two glad hand seals of FIG. 6a after mating has been effected and illustrating swaging of the lower seal.
Figure 6C:
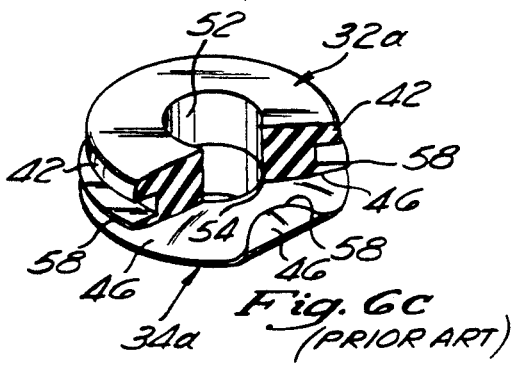
FIG. 6c is a perspective view of the glad hand seals of FIG. 6b having a portion of the upper seal broken away to better illustrate swaging of the lower seal.

Referring now to FIGS. 6a, 6b and 6c, a problem commonly associated with prior art glad hand seals, known as swaging, is illustrated. With particular reference to FIG. 6a, during the mating process, the upper surfaces of two glad hand seals 32a and 34a frictionally engage and rub across each other as the glad hand seals 32a and 34a are brought into laminar juxtaposition. During this process, it is not uncommon for the right angle or non-beveled upper surface or periphery 54 of the bore 52 of one seal to engage the outer periphery or sharp edge 58 of the other seal.

With particular reference to FIG. 6b, the engagement of the sharp edge 58 of the lower seal 34a with the non-beveled upper surface or periphery 54 of the bore 52 frequently results in rolling over or swaging of the periphery or sharp edge 58 of the upper portion 46 of the lower seal 34a. The sharp edge 58 of the upper portion 46 of the lower seal 34a thus becomes captured intermediate the upper 32a and lower 34a glad hand seals. This results in undesirable stresses in the lower seal 34a which may result in wear or tearing thereof. Additionally, a proper seal is not formed due to the introduction of the sharp edge 58 at the mating surfaces of the upper 32a and lower 34a glad hand seals. Thus, such swaging is undesirable.

Figure 5A:
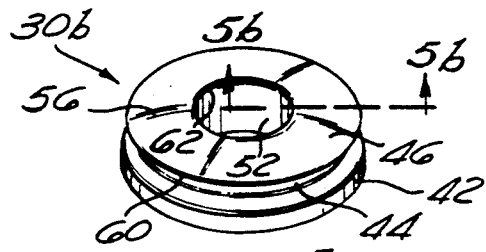
FIG. 5a is a perspective view of the glad hand seal of the present invention.
Figure 5B:
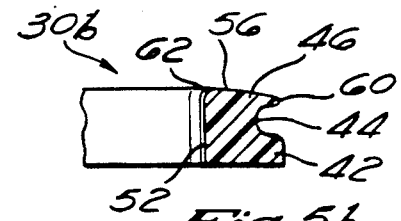

Referring now to FIGS. 5a and 5b, an improved glad hand seal 30b of the present invention is illustrated. The improved glad hand seal 30b of the present invention is specifically configured to mitigate the likelihood of swaging the during the coupling process. As in the prior art, the improved glad hand seal comprises a lower portion 42, and intermediate portion 44, and an upper portion 46. A bore 52 extends through the lower 42, intermediate 44, and upper 46 portions to provide fluid communication therethrough. The likelihood of swaging is mitigated by forming bevels upon both the outer periphery of the upper surface 46 thereof and upon the upper surface of the bore 52.

The lower portion 42 of the seal has an outer diameter of between approximately 1⅜ inch and approximately 1½ inch, preferably 11 7/16 inch. The intermediate portion 44 has an outer diameter of between approximately 1 1/16 inch and approximately 1 3/16 inch, preferably approximately 1⅛ inch. The upper portion 46 has an outer diameter of between approximately 1¼ inch and 1⅜ inch, preferably approximately 1⅜ inch. The bore 52 preferably has a diameter of approximately ⅝ inch. The seal is preferably approximately ⅜ inch thick.

A bevel 60 formed upon the outer diameter of the upper portion has a radius of at least approximately 1/64 inch, preferably of approximately 1/32 inch.

The bore 52 of the seal, at the upper surface 56 thereof, has a bore bevel 62 formed thereon having a radius of at least approximately 1/64 inch, preferably approximately 1/32 inch.

With particular reference to FIG. 5b, the rounded edge or bevel 60 is formed at the outer periphery of the upper portion 46. This eliminates the sharp edge 58 present in the prior art glad hand seal. It consequently makes the thickness of the material at the periphery of the upper surface 46 of the seal substantially greater and consequently more rigid.

The bore bevel 62 is formed at the juncture of the upper surface 56 of the upper portion 46 in the bore 52, thus eliminating the right angle 54 of the prior art.

Figure 7:
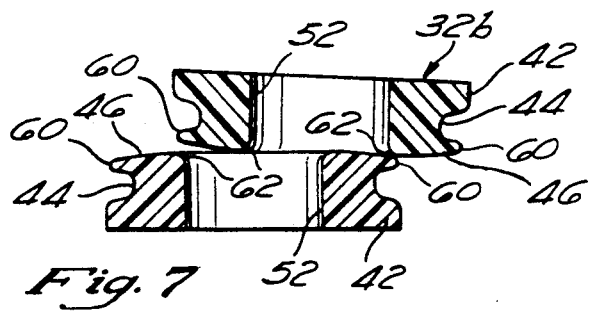
FIG. 7 is a cross-sectional side view of two glad hand seals of the present invention in the process of mating.

Referring now to FIG. 7, as the upper glad hand seal 32b of the present invention slides across the lower glad hand seal 34b of the present invention, the upper surface peripheral bevel 60 of the lower seal is not likely to catch upon the bore bevel 62 of the upper seal 32b, thus substantially reducing the likelihood of swaging. Indeed, the increased rigidity of the periphery of the upper portion 46 of the glad hand seal of the present invention at the bevel 60 further reduces the likelihood of swaging. Forming the glad hand seal of the present invention from a material having a lower coefficient of friction than that of rubber, preferably polyurethane, further reduces the likelihood of swaging.

Figure 8:
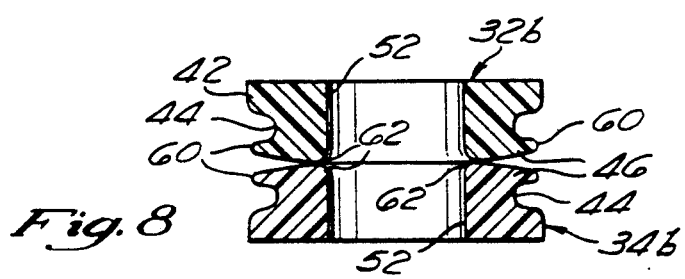
FIG. 8 is a cross-sectional side view of the two glad hand seals of FIG. 7 at the completion of the mating process.

Referring now to FIG. 8, coupling of the upper 32b and lower 34b glad hand seals of the present invention is illustrated. Swaging does not occur and consequently a reliable, effective, and long lasting coupling is achieved.

It is understood that the exemplary glad hand seal described herein and shown in the drawings represents only a presently preferred embodiment of the invention. Indeed, various modifications and additions may be made to such embodiment without departing from the spirit and scope of the invention. For example, the seal need not be configured precisely as described and illustrated in the drawings, rather, it is only essential that the upper portion thereof be formed in a manner which mitigates the potential for swaging, i.e. is thicker and more rigid at its periphery. Also, color coding of the seals need not comprise the formation of seals having a uniform, homogeneous, color throughout. Rather, various means for applying or forming colors upon the seal, i.e. striping, dots, etc., are likewise contemplated.

Furthermore, application of the improved glad hand seal of the present invention need not be limited to use in tractor trailers. Rather, those skilled in the art will recognize that various other uses also exist. Thus, these and other modifications and additions may be obvious to those skilled in the art and may be implemented to adapt the present invention for use in a variety of different applications.

What is claimed is:

1. A seal for use in fluid couplings, said seal comprising;
    a) a lower portion;
    b) an intermediate portion disposed above said lower portion;
    c) an upper portion disposed above said intermediate portion;
    d) a bore extending through said lower, intermediate, and upper portions for providing fluid communication through the seal;
    e) a bore bevel formed upon the upper portion about said bore; and
    f) wherein the bore bevel formed upon the upper portion mitigates the likelihood for swaging during the coupling process.

2. The seal as recited in claim 1 wherein the bore bevel formed upon the upper portion about said bore has a radius of at least approximately 1/64 inch.

3. The seal as recited in claim 1 wherein said bore bevel formed upon the upper portion about said bore has a radius of approximately 1/32 inch.

4. The seal as recited in claim 1 further comprising a color code formed upon said upper portion to distinguish use between normal and emergency compressed air line couplings in a truck braking system.

5. The seal as recited in claim 1 wherein the seal is substantially comprised of a first color to indicate that it is to be used in the normal compressed air line coupling and is substantially comprised of a second color to indicate that it is to be used in the emergency compressed air line coupling.

6. The seal as recited in claim 5 wherein the first color is blue and the second color is red.

7. The seal as recited in claim 1 wherein said lower, intermediate, and top portions are formed of polyurethane.

8. A seal for use in fluid couplings, said seal comprising:
    a) a lower portion;
    b) an intermediate portion disposed above said lower portion;
    c) an upper portion disposed above said intermediate portion;
    d) said lower, intermediate, and upper portions are comprised of polyurethane to reduce friction during the mating process to mitigate the probability of swaging;
    e) a bore extending through said lower, intermediate, and upper portions for providing fluid communication through the seal;
    f) a bore bevel formed upon the upper portion about said bore; and
    g) a color code formed upon said upper portion to distinguish use between normal and emergency compressed air line couplings in a truck braking system;
    h) wherein the bore bevel formed upon the upper portion mitigates the likelihood for swaging during the coupling process.

* * * * *